(12) United States Patent
Kim

(10) Patent No.: US 11,923,493 B2
(45) Date of Patent: Mar. 5, 2024

(54) STACKING SYSTEM OF BATTERY CELL

(71) Applicants: HYUNDAI MOTOR COMPANY, Seoul (KR); KIA CORPORATION, Seoul (KR)

(72) Inventor: Kyungmo Kim, Hwaseong-si (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 399 days.

(21) Appl. No.: 17/488,629

(22) Filed: Sep. 29, 2021

(65) Prior Publication Data

US 2022/0302489 A1    Sep. 22, 2022

(30) Foreign Application Priority Data

Mar. 16, 2021  (KR) ........................ 10-2021-0033963

(51) Int. Cl.
    *H01M 10/04*   (2006.01)
(52) U.S. Cl.
    CPC ....... *H01M 10/0404* (2013.01); *H01M 10/04* (2013.01); *H01M 10/0413* (2013.01)
(58) Field of Classification Search
    CPC .......................... H01M 10/0404; H01M 10/04
    See application file for complete search history.

(56) References Cited

U.S. PATENT DOCUMENTS

| 8,123,889 | B2 * | 2/2012 | Numao | H01M 8/0228 |
| | | | | 156/182 |
| 2014/0027067 | A1 * | 1/2014 | Yuhara | H01M 10/0404 |
| | | | | 156/580 |
| 2021/0013481 | A1 * | 1/2021 | Kuwata | H01M 50/244 |

FOREIGN PATENT DOCUMENTS

| EP | 3955332 A1 * | 2/2022 | ........ H01M 10/0404 |
| KR | 102043113 B1 * | 4/2019 | ........ H01M 10/0404 |
| WO | WO-2020209502 A1 * | 10/2020 | ........ H01M 10/0404 |

OTHER PUBLICATIONS

Machine translation of KR-102043113-B1 (Year: 2019).*

* cited by examiner

*Primary Examiner* — Scott W Dodds
(74) *Attorney, Agent, or Firm* — MCDONNELL BOEHNEN HULBERT & BERGHOFF LLP

(57) ABSTRACT

A stacking system of a battery cell repeatedly and sequentially stacks a battery cell, in which a negative electrode plate, a separator, and a positive electrode plate are stacked and packaged by an exterior material, along with a pad to manufacture a battery module. The stacking system includes a pad supply unit to which a pad is supplied, a plurality of battery cell supply units to which the battery cell is respectively supplied, an applying unit disposed on one battery cell supply unit among a plurality of battery cell supply units and applying an adhesive to the upper surface of the supplied battery cell, and a stacking unit for stacking and exhausting the battery cell, the pad, and the battery cell applied with the adhesive in a predetermined order by a predetermined number while selectively moving the pad supply unit, and the battery cell supply unit through a main frame.

13 Claims, 7 Drawing Sheets

STACKING SYSTEM OF BATTERY CELL

CROSS REFERENCE TO RELATED APPLICATIONS

This application claims priority to and the benefit of Korean Patent Application No. 10-2021-0033963 filed in the Korean Intellectual Property Office on Mar. 16, 2021, the entire contents of which are incorporated herein by reference.

BACKGROUND

(a) Field

The present disclosure relates to a stacking system of a battery cell. More particularly, the present disclosure relates to a stacking system of a battery cell capable of simultaneously performing stacking and transferring of a battery cell.

(b) Description of the Related Art

Currently, secondary batteries that may be commercially available include nickel cadmium batteries, nickel hydrogen batteries, nickel zinc batteries, and lithium secondary batteries.

Among them, the lithium secondary batteries have little memory effect compared to the nickel-based secondary batteries, so they are free to be charged and discharged, have very low self-discharge rates, and have high energy density.

The lithium secondary battery mainly uses a lithium-based oxide carbon material as a positive active material and a negative active material, respectively.

Such a lithium secondary battery forms a battery cell by having an exterior material that seals and accommodates the electrode assembly in which positive and negative plates that are coated with the positive active material and the negative active material, respectively, are disposed via a separator therebetween along with an electrolyte solution.

In general, the battery cell may be classified into a can-type in which the electrode assembly is embedded in a metal can and a pouch-type in which the electrode assembly is embedded in a laminate sheet pouch of aluminum and polymer resin, depending on the shape of the exterior material.

In recent years, secondary batteries are widely used not only in small devices such as portable electronic devices, but also in mid-to large-sized devices such as vehicles and power storage devices.

When the secondary battery is used in the medium or large-sized devices, a large number of battery cells are electrically connected to increase a capacity and an output.

Particularly, the pouch-type is widely used in the medium and large-sized devices due to merits such as low weight, low production cost, and easy shape transformation.

However, the pouch-type battery cell generally does not have large mechanical strength, and the battery itself does not include a structure for mutually bonding the batteries, thereby it is difficult to be stacked.

When constructing the battery module by stacking a plurality of pouch-type battery cells, stacking alignment of the battery cells acts as a very important factor in order to assemble additional parts, electrically connect them, or ensure cooling performance in a later process.

Accordingly, the position is corrected by regulating outer dimensions of the battery cell of a non-rigid pouch type, and all four surfaces of the battery cell must be regulated for the stacking between the battery cells.

In addition, in conventional art, there are several steps to assemble the battery cell, but the trajectory of transporting the battery cell is complicated, and accordingly, there is a drawback that it increases the assembly time.

In addition, in conventional art, during a plurality of processes of transporting the battery cell, there is a possibility of damage being applied to the pouch of the battery cell.

The above information disclosed in this Background section is only for enhancement of understanding of the background of the disclosure, and therefore it may contain information that does not form the prior art that is already known in this country to a person of ordinary skill in the art.

SUMMARY

An embodiment of the present disclosure is to provide a stacking system of a battery cell that improves a production speed by minimizing a movement trajectory of the battery cell in stacking the battery cells to manufacture a battery module.

In addition, an embodiment of the present disclosure provides a stacking system of a battery cell that may improve marketability by minimizing the number of times that the battery cell is handled to prevent damage to the pouch constituting the battery cell.

A stacking system of a battery cell according to an embodiment of the present disclosure as a stacking system of a battery cell repeatedly and sequentially stacking a battery cell, in which a negative electrode plate, a separator, and a positive electrode plate are stacked and packaged by an exterior material, along with a pad to manufacture a battery module, includes a pad supply unit to which a pad is supplied, a plurality of battery cell supply units, a battery cell being supplied to each of the battery cell supply units, an applying unit disposed on one of the plurality of battery cell supply units, the applying unit being configured to apply an adhesive to the upper surface of the supplied battery cell, and a stacking unit for stacking and exhausting the battery cell, the pad, and the battery cell applied with the adhesive in a predetermined order by a predetermined number while selectively moving the pad supply unit, and the battery cell supply unit through a main frame.

The stacking unit may include a mounting bracket mounted to the main frame and configured to more in four directions, a fixing bracket mounted to a front of a drive shaft of a first motor fixed to the mounting bracket to be configured to operate in a vertical direction by the first motor and formed of a box shape in which a lower surface and one side surface are opened to stack the battery cell and pad together, a vertical absorption plate configured in plural on the sides of the battery cell, and pad stacked inside the fixing bracket and vacuum absorbing the sides of the battery cell and pad, and a horizontal absorption plate disposed inside the fixing bracket and vacuum-adsorbing the battery cell that is stacked first while moving in a vertical direction by a pair of second motors fixed outside the fixing bracket.

The vertical absorption plate may be disposed symmetrically on both inner surfaces of the stacking direction in which the battery cell and the pads are stacked inside the fixing bracket.

The vertical absorption plate may be formed of a rubber material.

The pair of second motors may be fixed to the lower side of the fixing bracket and a drive shaft of each of the second motors is formed of a ball screw fixed to the upper side of the fixing bracket, and each of the second motors is configured to operate the horizontal absorption plate through a nut block mounted on the drive shaft of each of the second motors.

The horizontal absorption plate may be connected to the nut block with both sides and configured to rise or fall by the second motor depending on whether the battery cell and pad are stacked.

The horizontal absorption plate may be supported through a rail configured at the inner surface of the fixing bracket to operate in a vertical direction.

The main frame may include both first main frames disposed on both sides of the first direction based on the horizontal direction, and a second main frame mounted on the both first main frames and moving in the second direction based on the horizontal direction along the first main frame.

The pad supply unit may comprise a pad mounting plate disposed side by side on the work table to supply a pad, respectively, and a mounting groove may be formed on the top surface of the pad mounting plate so that the pad may be seated.

A plurality of penetration holes may be formed on the mounting groove.

The pad supplied to the pad supply unit may include the adhesive member on both surfaces.

The battery cell supply unit may include a battery cell mounting plate disposed in a same direction as the work table and on which the battery cell is mounted, a clamper configured along the circumference of the battery cell mounting plate to position the battery cell at a home position, and a sensor mounted on the work table at a position adjacent to the battery cell mounting plate and sensing the home position of the battery cell.

The applying unit may include a first sub-frame that operates in a direction closer to and further away from the battery cell supply unit, a second sub-frame disposed at both ends of the first sub-frame, to which the first sub-frame is inserted, and operating the first sub-frame, a moving block mounted on the first sub-frame and moving along the first sub-frame, a connection frame mounted on the moving block, and an applying tool mounted on the front end of the connection frame and mounted with a nozzle to apply the adhesive to the upper surface of the battery cell by receiving an adhesive from an adhesive tank.

In the stacking system of the battery cell according to an embodiment of the present disclosure, there is an effect of minimizing the movement trajectory of the battery cell and thus improving the process speed in stacking battery cells to manufacture the battery module.

In addition, the stacking system of the battery cell according to an embodiment of the present disclosure comprises a structure capable of stacking the battery cells and the pads simultaneously and exhausting them through the stacking unit, thereby reducing and simplifying the equipment area.

Further, effects that can be obtained or expected from embodiments of the present disclosure are directly or suggestively described in the following detailed description. That is, various effects expected from embodiments of the present disclosure will be described in the following detailed description.

DETAILED DESCRIPTION

Figure 1:
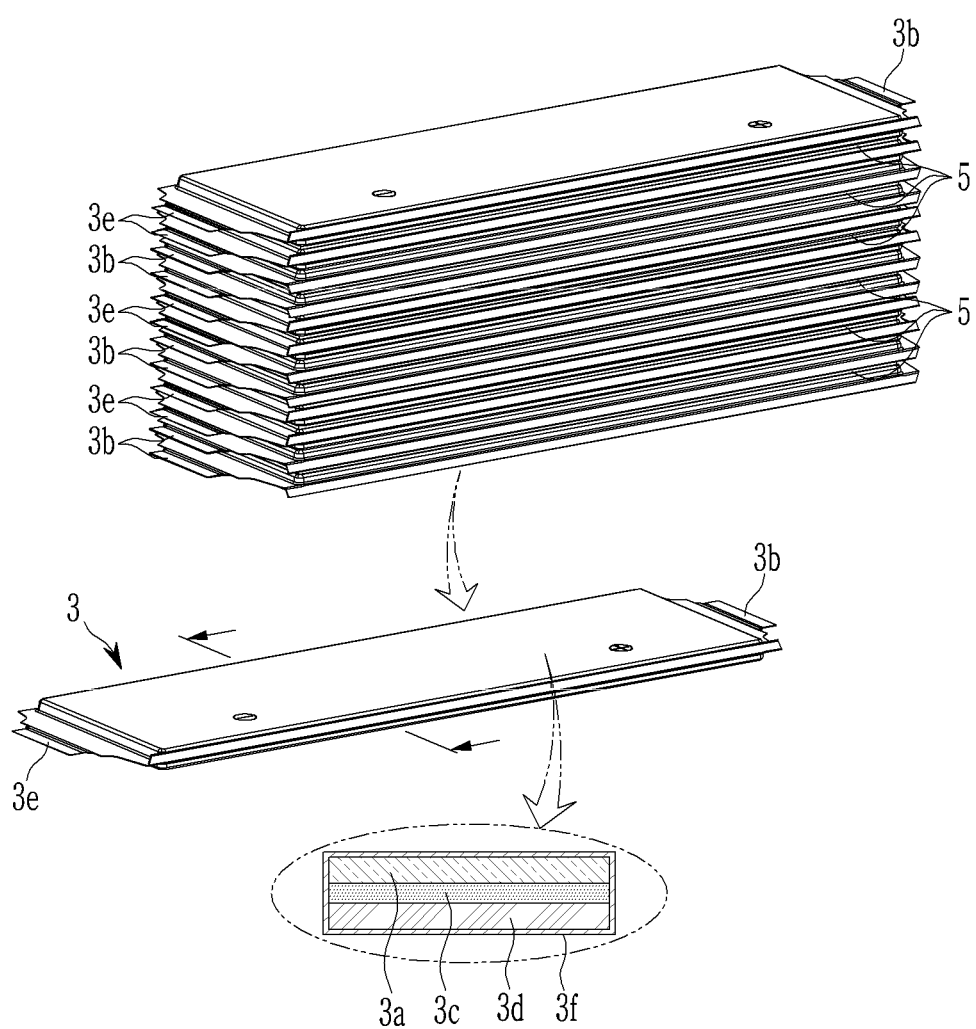
FIG. 1 is a schematic diagram of a battery module manufactured by a stacking system of a battery cell according to an embodiment of the present disclosure.

The present disclosure will be described more fully hereinafter with reference to the accompanying drawings, in which embodiments of the disclosure are shown. As those skilled in the art would realize, the described embodiments may be modified in various different ways, all without departing from the spirit or scope of the present disclosure.

Parts not relevant to description of embodiments of the present disclosure are omitted for describing the present disclosure clearly, and throughout the specification, identical or similar elements are given the same reference numerals.

In the following description, dividing names of components into first, second, and the like is to divide the names because the names of the components are the same as each other, and an order thereof is not particularly limited.

FIG. 1 is a schematic diagram of a battery module manufactured by a stacking system of a battery cell according to an embodiment of the present disclosure.

Referring to FIG. 1, a battery cell 3 applied to a stacking system of a battery cell 10 according to an embodiment of the present disclosure includes a negative electrode plate 3a, a separator 3c, and a positive electrode plate 3d that are stacked and packaged by an exterior material 3f.

In the battery cell 3, a negative lead 3b and a positive lead 3e are exposed to the outside of the exterior material 3f.

In addition, the exterior material 3f of the battery cell 3 is made of a flexible material, and in a state that an electrolyte is charged inside, the exterior material 3f may seal the negative electrode plate 3a, the separator 3c, and the positive electrode plate 3d.

A plurality of battery cells 3 are stacked to form a battery module 1.

The battery module 1 is configured by interposing a pad 5 between battery cells 3. That is, in the battery module 1, a battery cell 3, the pad 5, and another battery cell 3 are configured as a set, and such a set may be stacked by a predetermined number to form the battery module 1.

Adhesive members 7 are formed on both surfaces of the pad 5.

Thus, in one set, the battery cells 3 are adhered to each other by the adhesive member 7 configured on both surfaces of the pad 5.

In addition, when the battery cell 3 is stacked, an alignment degree acts as a factor, so four surfaces of the battery cell 3 should be stacked in a regulated state.

In addition, damage to the battery cell 3 may be prevented by minimizing a moving line through which the battery cell 3 is transported.

Figure 2:
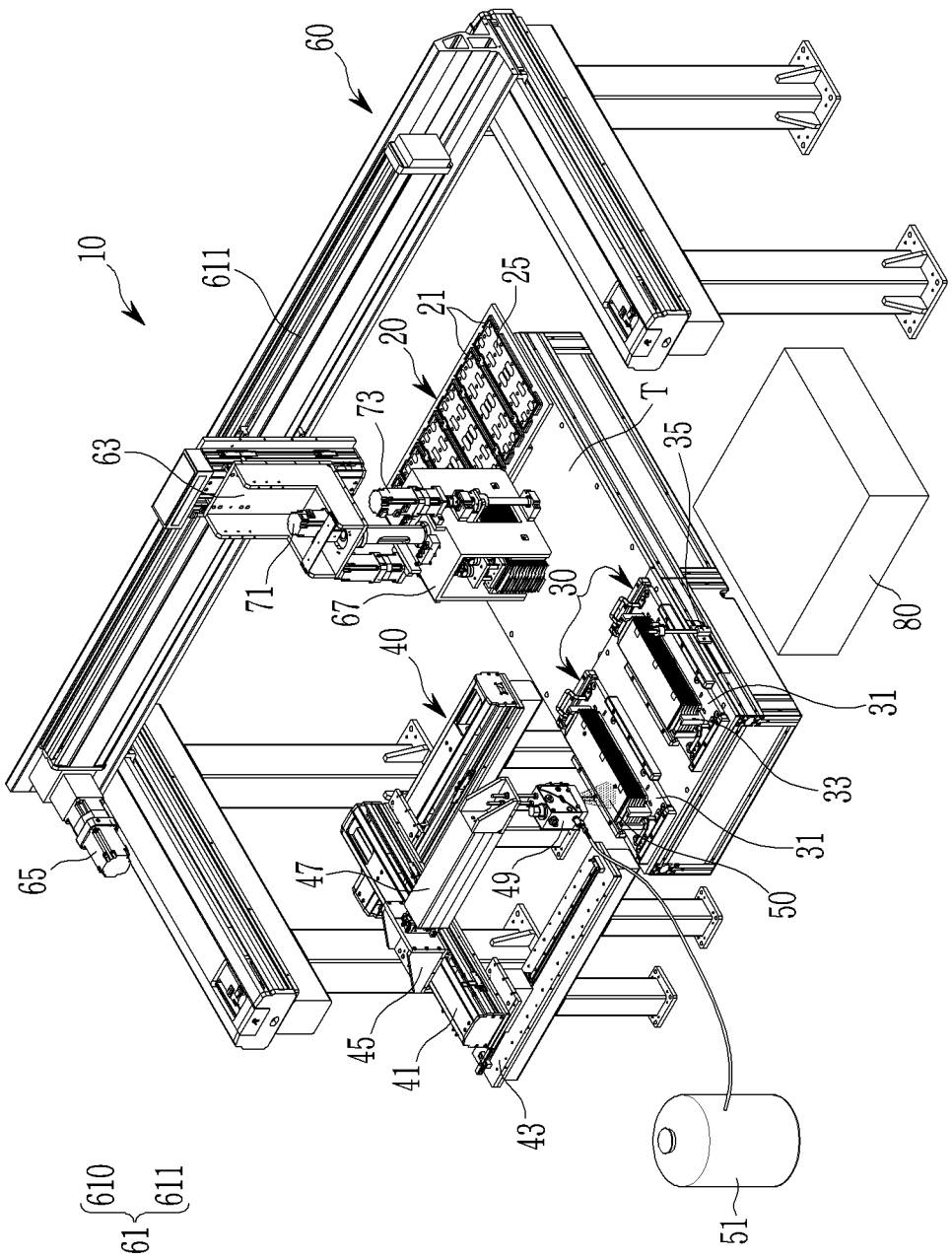
FIG. 2 is an entire schematic diagram of a stacking system of a battery cell according to an embodiment of the present disclosure.

FIG. 2 is an entire schematic diagram of a stacking system of a battery cell according to an embodiment of the present disclosure.

For this, a stacking system of a battery cell 10 according to an embodiment of the present disclosure includes a pad supply unit 20, a cell supply unit 30, an applying unit 40, and a stacking unit 60.

Referring to FIG. 2, in an embodiment of the present disclosure, in the stacking system of the battery cell 10, the stacking unit 60 is configured over the entire upper part, the pad supply unit 20 and the cell supply unit 30 are configured under the stacking unit 60, and the applying unit 40 is formed on one side of the cell supply unit.

In an embodiment of the present disclosure, based on FIG. 2, front and rear, left and right, and vertical directions are set as reference directions.

The definition of the reference directions as described above is a relative meaning, and the directions may vary depending on the reference position of the present device or the reference position of the assemble part, and thus the reference direction is not necessarily limited to the reference direction of the present embodiment.

In the following, the battery cell supply unit 30 side is defined as the front, the pad supply unit 20 side is defined as the rear side, the front and rear direction is set as the reference direction, and the part facing the upper side is defined as an upper part, an upper end, an upper surface, and an upper end part, and the part facing the lower side is defined as a lower part, a lower end, a lower surface, and the lower end part.

Furthermore, the end (one side/one end or the other side/the other end) in the following may be defined as an end of any one side, and it may also be defined as a certain part (one side/one end part or the other side/the other end part) including the end.

Figure 3:
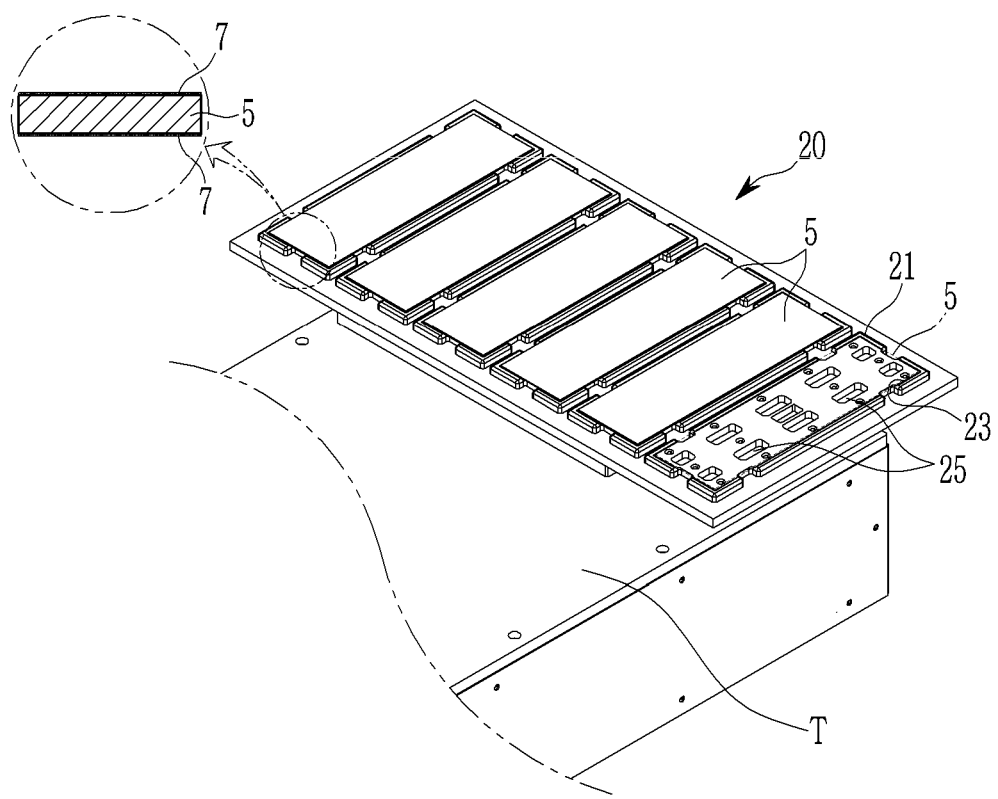
FIG. 3 is a schematic diagram of a pad supply unit applied to a stacking system of a battery cell according to an embodiment of the present disclosure.

FIG. 3 is a schematic diagram of a pad supply unit applied to a stacking system of a battery cell according to an embodiment of the present disclosure.

Referring to FIG. 3, in the present embodiment, the pad supply unit 20 is a place where the pad 5 is supplied between the battery cells 3.

The pad supply unit 20 is composed of a pad mounting plate 21 that is arranged side by side on the work table T and to which the pad 5 is supplied.

A mounting groove 23 is formed on the upper surface of the pad mounting plate 21 so that the pad 5 may be seated.

The mounting groove 23 serves to regulate the position of the pad 5 so that the pad 5 may be stacked in the home position along the circumference of the pad 5. A plurality of penetration holes 25 are formed in the mounting groove 23. The penetration holes 25 are configured to minimize sticking of the pad 5 to the pad mounting plate 21 by the adhesive member 7 on both surfaces of the pad 5.

The battery cell supply unit 30 is disposed in front of the pad supply unit 20.

Figure 4:
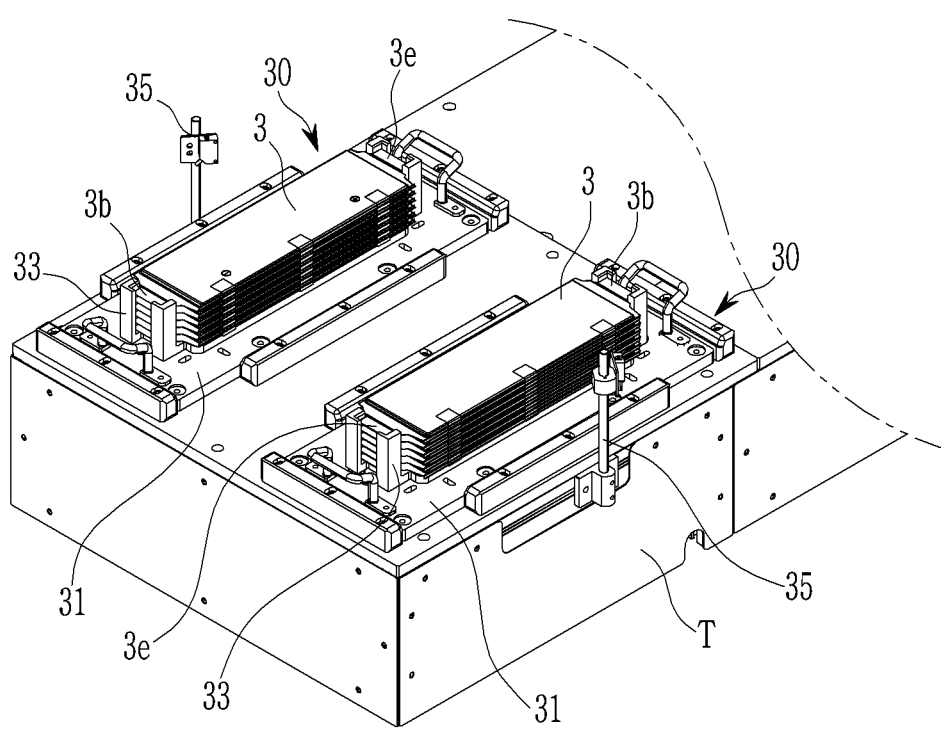
FIG. 4 is a schematic diagram of a pad supply unit applied to a stacking system of a battery cell according to an embodiment of the present disclosure.

FIG. 4 is a schematic diagram of a pad supply unit applied to a stacking system of a battery cell according to an embodiment of the present disclosure.

Referring to FIG. 4, in the present embodiment, two the battery cell supply units 30 are present so that the battery cells 3 are supplied, respectively.

The battery cell supply unit 30 is configured on the work table T.

This work table T may be the same table as the pad supply unit 20, or may be a different table. In addition, the battery cell supply unit 30 is disposed in the same direction in a state adjacent to the work table T, and includes a battery cell mounting plate 31 on which the battery cell 3 is directly mounted.

In the circumference of the battery cell mounting plate 31, a clamper 33 is configured.

The clamper 33 is configured to place the battery cell 3 in the home position.

A plurality of battery cells 3 are supplied to the battery cell supply unit 30, and it is advantageous to supply the battery cell 3 to the adjacent battery cell supply units 30 by crossing the supply direction.

For example, if one battery cell supply unit 30 disposes the negative lead 3b forward to supply the battery cell 3, the other adjacent battery cell supply unit 30 disposes the positive lead 3e forward to supply the battery cell 3.

This is to align the directions of the negative lead 3b and the positive lead 3e in a predetermined direction when stacking the battery cell 3.

Also, the sensor 35 may be configured at the adjacent position to the battery cell mounting plate 31.

The sensor 35 is mounted to the work table T and senses the home position of the battery cell 3 seated to the battery cell mounting plate 31.

Among a plurality of battery cell supply units 30 described above, at least one battery cell supply unit 30 is configured to operate the applying unit 40.

Figure 5:
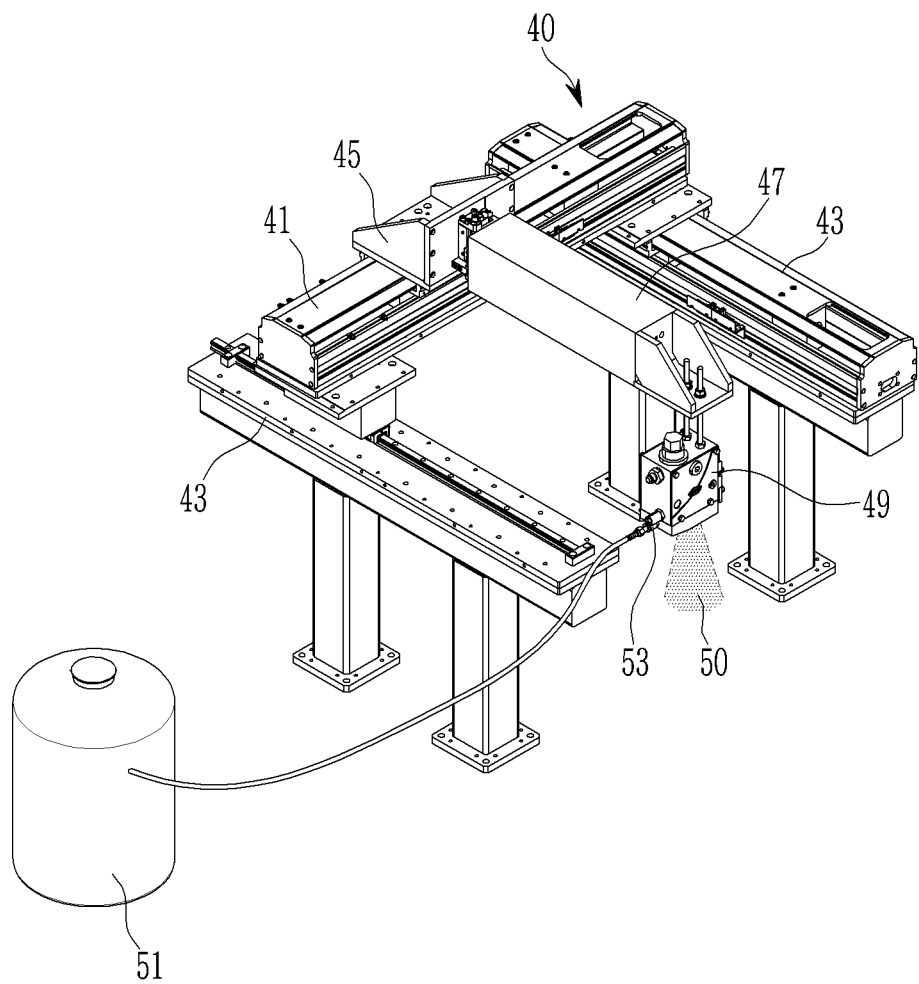
FIG. 5 is a schematic diagram of an applying unit applied to a stacking system of a battery cell according to an embodiment of the present disclosure.

FIG. 5 is a schematic diagram of an applying unit applied to a stacking system of a battery cell according to an embodiment of the present disclosure.

Referring to FIG. 5, in the present embodiment, an example in which the applying unit 40 is configured on the left side of a plurality of battery cell supply units 30 is described.

However, it should be understood that the position of the applying unit 40 may be changed.

The applying unit 40 is disposed on one battery cell 3 unit, and is configured to apply the adhesive 50 to the upper surface of the supplied battery cell 3.

To this end, the applying unit 40 includes a first sub-frame 41 that operates in a direction closer and farther away from the battery cell supply unit 30, that is, a left and right direction. The first sub-frame 41 is operated along the second sub-frame 43 respectively disposed at both ends. The first sub-frame 41 may be inserted into the second sub-frame 43 to operate the first sub-frame 41. In the first sub-frame 41, a moving block 45 is installed. The moving block 45 is configured to move along the first sub-frame 41, that is, in a forward and backward direction.

The connection frame 47 is mounted on the moving block 45.

In addition, the applying tool 49 is mounted on the front end of the connection frame 47. The applying tool 49 applies the adhesive 50 to the upper surface of the battery cell 3.

The applying tool 49 receives the adhesive 50 from a separate adhesive tank 51, and a nozzle 53 is mounted to apply the adhesive 50 to the upper surface of the battery cell 3.

A stacking unit 60 is formed on the upper side of the pad supply unit 20, the battery cell supply unit 30, and the applying unit 40.

Figure 6:
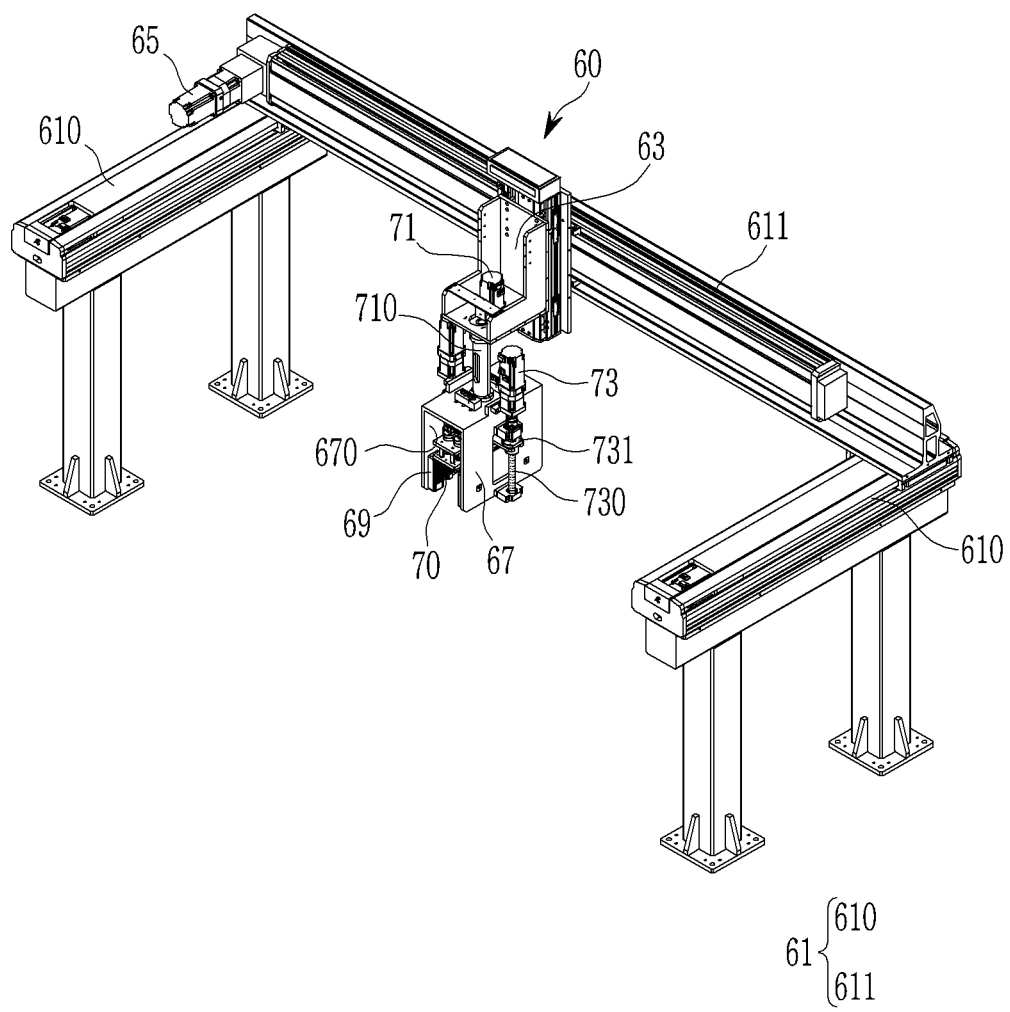
FIG. 6 is a schematic diagram of a stacking unit applied to a stacking system of a battery cell according to an embodiment of the present disclosure.
Figure 7:
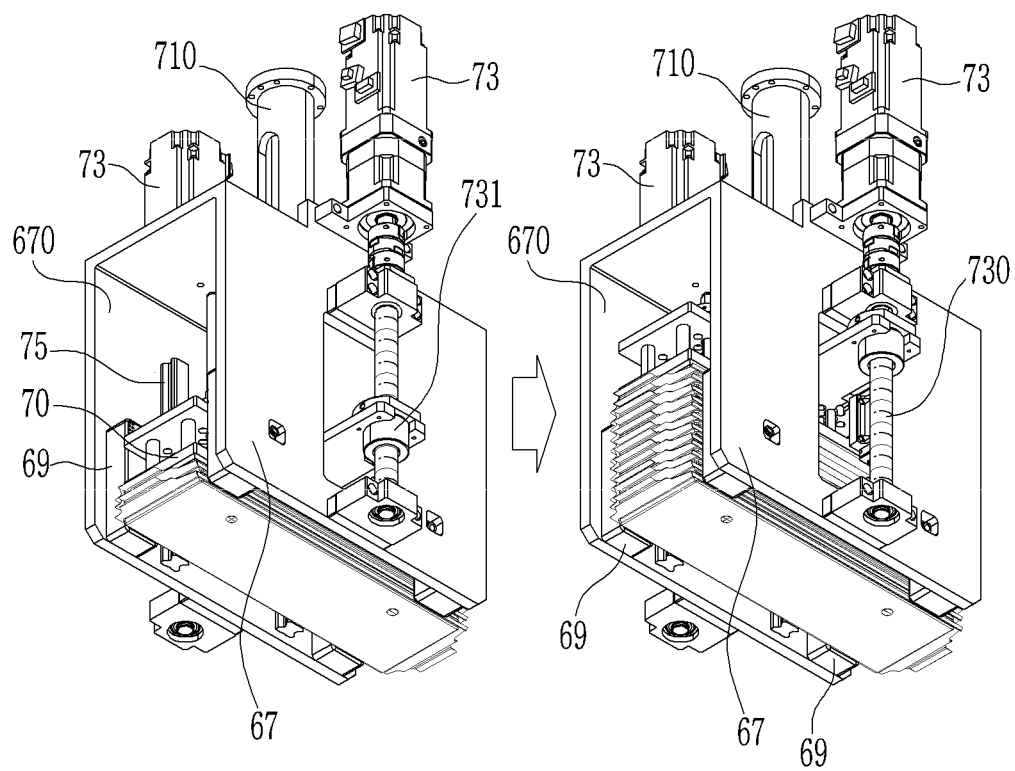
FIG. 7 is a schematic diagram of a stacking unit applied to a stacking system of a battery cell according to an embodiment of the present disclosure.

FIG. 6 is a schematic diagram of a stacking unit applied to a stacking system of a battery cell according to an embodiment of the present disclosure, and FIG. 7 is a schematic diagram of a stacking unit applied to a stacking system of a battery cell according to an embodiment of the present disclosure.

Referring to FIG. 6, in the present embodiment, the stacking unit 60 and may stack and exhaust the battery cell 3, the pad 5, and another battery cell 3 coated with the adhesive 50 by a predetermined order by a predetermined number while selectively moving the pad supply unit 20 and the battery cell supply unit 30 through the main frame 61.

To this end, the stacking unit 60 is largely composed of a mounting bracket 63, a fixing bracket 67, a vertical absorption plate 69, and a horizontal absorption plate 70.

The mounting bracket 63 is mounted on the main frame 61 and is configured to move in all directions.

The main frame 61 is composed of a first main frame 610 and a second main frame 611. The first main frame 610 is disposed on both sides of the first direction based on the horizontal direction, that is, on both sides of the left and right directions of the pad supply unit 20 and the battery cell supply unit 30. The second main frame 611 is mounted on the first main frame 610 on both sides. The second main frame 611 is configured to move along the first main frame 610 in the second direction based on the horizontal direction, that is, a forward and backward direction.

The mounting bracket 63 is mounted on the first main frame 610 of the main frame 61 described above.

The mounting bracket 63 operates in the left and right direction along the first main frame 610 through a drive motor 65 configured on one side of the first main frame 610.

A fixing bracket 67 is connected to the mounting bracket 63.

The fixing bracket 67 may be mounted on the front of the drive shaft 710 of the first motor which is fixed to the mounting bracket 63. Thus, the fixing bracket 67 is configured to operate in the vertical direction by the first motor 71. The fixing bracket 67 has a box shape of which the lower surface and one side surface are opened, so that a plurality of the battery cells 3 and pads 5 are stacked therein.

A vertical absorption plate 69 is disposed inside the fixing bracket 67.

The vertical absorption plate 69 may be formed in a plurality on the side surfaces of the battery cell 3 and the pad 5 that are stacked inside the fixing bracket 67. The vertical absorption plate 69 may be symmetrically disposed on both inner surfaces 670 in the stacking direction in which the battery cell 3 and the pad 5 are stacked inside the fixing bracket 67. In addition, it is advantageous that the vertical absorption plate 69 is made of a rubber material. That is, the vertical absorption plate 69 vacuum-adsorbs both sides of the stacked battery cell 3 and the pad 5 to prevent the battery cell 3 and the pad 5 from slipping off.

In addition, a horizontal absorption plate 70 is disposed inside the fixing bracket 67.

The horizontal absorption plate 70 may be moved in a vertical direction to a pair of second motors 73 fixed on the outside of the fixing bracket 67. The second motor 73 is fixed on the upper side of the fixing bracket 67. The second motor drive shaft 730 comprises a ball screw. That is, in the state that the second motor 73 is fixed to the upper side of the fixing bracket 67, the front of the second motor drive shaft 730 is fixed to the lower side of the fixing bracket 67.

A nut block 731 is mounted on the second motor drive shaft 730, and the horizontal absorption plate 70 is connected through the nut block 731 to operate the horizontal absorption plate 70.

Accordingly, the horizontal absorption plate 70 is connected to the nut block 731 at both sides, and is configured to rise or fall by the second motor 73 depending on whether the battery cell 3 and the pad 5 are stacked.

In addition, the horizontal absorption plate 70 may be operated in a vertical direction by being supported by the rail 75 configured on the inner surface 670 of the fixing bracket 67.

The operation of the stacking unit 60 described above is as follows.

The battery module 1 stacked through the stacking system of the battery cell 10 according to an embodiment of the present disclosure may be formed by repeatedly stacking a predetermined number of the battery cell 3, the pad 5, another battery cell 3, a battery cell 3 applied with the adhesive 50, another pad 5, another battery cell 3, another battery cell 3 applied with the adhesive 50, another pad 5, and another battery cell 3.

Accordingly, the stacking unit 60 may stack the battery cell 3 and the pad 5 by the predetermined number while repeatedly moving in the order of the battery cell supply unit 30, the pad supply unit 20, the battery cell supply unit 30, the battery cell supply unit 30 applied with the adhesive 50 through the applying unit 40, the pad supply unit 20, the battery cell supply unit 30, the battery cell supply unit 30 applied with the adhesive 50 through the applying unit 40, the pad supply unit 20, and the battery cell supply unit 30.

The stacking unit 60 moves in all directions through the main frame 61, and can also move in a vertical direction by the first motor 71.

Referring to FIG. 7, in the stacking unit 60, the horizontal absorption plate 70 increases whenever the battery cell 3 and the pad 5 are stacked.

The stacking unit 60 operates through the second motor drive shaft 730 made of a ball screw, and is supported by the rail 75 mounted on the inner surface 670 of the fixing bracket 67 and operates.

The stacking unit 60 is configured to vacuum-adsorb the battery cell 3 first stacked inside the fixing bracket 67 through the horizontal absorption plate 70, and to vacuum adsorb the sides of the battery cell 3 and the pad 5 stacked inside the fixing bracket 67 through the vertical absorption plate 69 not to be fallen off.

Finally, when the stacking unit 60 stacks the battery cells 3 and the pad 5 by a predetermined number, the stacking unit 60 moves to a separate exhaust table (80, referring to FIG. 2), and the battery cell 3 and the pads 5 are exhaust by the operation of the second motor 73.

Therefore, the stacking system of the battery cell 10 according to an embodiment of the present disclosure minimizes the movement trajectory of the battery cell 3 in stacking the battery cell 3 to manufacture the battery module 1, thereby improving the process speed.

That is, the stacking system of the battery cell 10 is composed of a structure capable of simultaneously stacking and exhausting the battery cell 3 and the pad 5 through the stacking unit 60, thereby reducing and simplifying the equipment area.

As a result, the stacking system of the battery cell 10 improves productivity while reducing an equipment investment.

In addition, the cell stacking system may prevent damage to an exterior material 3f constituting the battery cell 3 by minimizing the number of handling times of the battery cell 3.

While this disclosure has been described in connection with what is presently considered to be practical embodiments, it is to be understood that the disclosure is not limited to the disclosed embodiments. On the contrary, it is intended to cover various modifications and equivalent arrangements included within the spirit and scope of the appended claims.

The invention claimed is:

1. A stacking system for stacking a plurality of battery cells repeatedly and sequentially along with at least one pad to manufacture a battery module, wherein each of the battery cells comprises a negative electrode plate, a separator, and a positive electrode plate stacked and packaged by an exterior material, the stacking system comprising:
   a pad supply unit supplied with the at least one pad;
   a plurality of battery cell supply units supplied with the plurality of battery cells, wherein each of the battery cell supply units is supplied with at least one battery cell;
   an applying unit disposed on one of the plurality of battery cell supply units, the applying unit being configured to manufacture at least one battery cell applied with adhesive by applying an adhesive to an upper surface of the at least one battery cell supplied at the one battery cell supply unit on which the applying unit is disposed; and
   a stacking unit configured to selectively move through a main frame and between the pad supply unit and the plurality of battery cell supply units to stack and exhaust the at least one battery cell, the at least one pad, and the at least one battery cell applied with the adhesive in a predetermined order in order to form the battery module with a predetermined stacking sequence.

2. The stacking system of claim 1, wherein the stacking unit includes:
   a mounting bracket mounted to the main frame and configured to move in four directions;
   a fixing bracket mounted to a front of a drive shaft of a first motor fixed to the mounting bracket, the fixing bracket being configured to operate in a vertical direction by the first motor and formed as a box shape in which a lower surface and one side surface are opened to stack the plurality of battery cells and the at least one pad therein;
   at least two vertical absorption plates positioned inside the fixing bracket, and configured for vacuum absorbing sides of a stack of the plurality of battery cells and the at least one pad in the fixing bracket; and
   a horizontal absorption plate disposed inside the fixing bracket and configured for vacuum absorbing an upper surface of the stack in the fixing bracket, and wherein the fixing bracket further comprises a pair of second motors fixed outside the fixing bracket and configured to move the horizontal absorption plate in a vertical direction.

3. The stacking system of claim 2, wherein the at least two vertical absorption plates are disposed symmetrically on inner surfaces inside the fixing bracket.

4. The stacking system of claim 2, wherein the at least two vertical absorption plates are formed of a rubber material.

5. The stacking system of claim 2, wherein each of the second motors is respectively fixed to opposing lower sides of the fixing bracket, and a drive shaft of each of the second motors is formed of a ball screw and respectively fixed to opposing upper sides of the fixing bracket, and each of the second motors is configured to operate the horizontal absorption plate through a nut block mounted on the drive shaft of each of the second motors.

6. The stacking system of claim 5, wherein the horizontal absorption plate is connected to the nut block on each of the second motors, and wherein each of the second motors are configured to raise and lower the horizontal absorption plate.

7. The stacking system of claim 2, wherein the horizontal absorption plate is supported by a rail configured at a surface inside the fixing bracket to operate the horizontal absorption plate in a vertical direction.

8. The stacking system of claim 1, wherein the main frame includes:
   two first main frames disposed apart in a first direction; and
   a second main frame mounted on the first main frames and configured to move along each of the first main frames in a second direction.

9. The stacking system of claim 1, wherein the pad supply unit includes a pad mounting plate disposed on a work table, wherein the pad mounting plate is supplied with the at least one pad; and
   a mounting groove is formed on the top surface of the pad mounting plate.

10. The stacking system of claim 9, wherein a plurality of penetration holes are formed in the mounting groove.

11. The stacking system of claim 1, wherein the at least one pad supplied on the pad supply unit includes the adhesive on both surfaces.

12. The stacking system of claim 1, wherein each battery cell supply unit includes:
   a battery cell mounting plate supplied with the at least one battery cell, the battery cell mounting plate being disposed on a work table;
   a clamper positioned along a perimeter of the battery cell mounting plate and configured to position the at least one battery cell at a home position; and
   a sensor mounted on the work table at a position adjacent to the battery cell mounting plate and sensing the home position of the at least one battery cell.

13. The stacking system of claim 1, wherein the applying unit includes:
   a first sub-frame inserted into second sub-frames and configured to operate along the second sub-frames in a direction closer to and further away from the one battery cell supply unit on which the applying unit is disposed;
   the second sub-frames disposed at both ends of the first sub-frame;
   a moving block mounted on the first sub-frame and configured to move along the first sub-frame;
   a connection frame mounted on the moving block; and
   an applying tool mounted on a front end of the connection frame and having a nozzle configured to apply the adhesive to the upper surface of the at least one battery cell by receiving the adhesive from an adhesive tank.

* * * * *